(12) United States Patent
Muthukumaran et al.

(10) Patent No.: US 12,353,740 B2
(45) Date of Patent: Jul. 8, 2025

(54) FLASH MEMORY LOCAL PURGE

(71) Applicant: QUALCOMM INCORPORATED, San Diego, CA (US)

(72) Inventors: Baranidharan Muthukumaran, San Diego, CA (US); Hung Vuong, San Diego, CA (US); Satish Anand, San Diego, CA (US); Benish Babu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/405,946

(22) Filed: Aug. 18, 2021

(65) Prior Publication Data

US 2022/0075523 A1 Mar. 10, 2022

Related U.S. Application Data

(60) Provisional application No. 63/075,435, filed on Sep. 8, 2020.

(51) Int. Cl.
*G06F 3/06* (2006.01)

(52) U.S. Cl.
CPC ............ *G06F 3/064* (2013.01); *G06F 3/0604* (2013.01); *G06F 3/0619* (2013.01); *G06F 3/0644* (2013.01); *G06F 3/0652* (2013.01); *G06F 3/0659* (2013.01); *G06F 3/0679* (2013.01)

(58) Field of Classification Search
USPC ......................................... 711/154
See application file for complete search history.

(56) References Cited

U.S. PATENT DOCUMENTS

| | | | |
|---|---|---|---|
| 10,572,392 B2* | 2/2020 | Bradbury | G06F 12/121 |
| 2008/0282024 A1* | 11/2008 | Biswas | G06F 12/0246 |
| | | | 711/162 |
| 2012/0278529 A1 | 11/2012 | Hars et al. | |

(Continued)

FOREIGN PATENT DOCUMENTS

| | | |
|---|---|---|
| CN | 104915151 A | 9/2015 |
| CN | 107003942 A | 8/2017 |

(Continued)

OTHER PUBLICATIONS

International Search Report and Written Opinion—PCT/US2021/046676—ISA/EPO—Dec. 1, 2021.

(Continued)

*Primary Examiner* — Jared I Rutz
*Assistant Examiner* — Elias Young Kim
(74) *Attorney, Agent, or Firm* — Smith Tempel Blaha LLC/Qualcomm

(57) ABSTRACT

Data may be purged from a memory device in a manner confined to a particular partition of a memory device having two or more partitions. Logical memory blocks may be de-mapped from physical memory blocks of a first storage partition of the memory device. De-mapped physical memory blocks of the first storage partition may be listed in a local de-mapped block list uniquely associated with the first storage partition. A local purge command may be received from a host device. In response to the local purge command, at least a portion of the de-mapped physical memory blocks listed only in the local de-mapped block list are purged.

14 Claims, 8 Drawing Sheets

(56) References Cited

U.S. PATENT DOCUMENTS

| | | | |
|---|---|---|---|
| 2014/0229661 A1* | 8/2014 | Tzeng | G06F 12/0866 |
| | | | 711/103 |
| 2014/0373184 A1 | 12/2014 | Mahaffey et al. | |
| 2015/0161034 A1* | 6/2015 | Fisher | G06F 3/0679 |
| | | | 711/103 |
| 2017/0262228 A1* | 9/2017 | Kanno | G06F 3/0616 |
| 2018/0032541 A1* | 2/2018 | Park | G06F 16/122 |
| 2018/0225200 A1* | 8/2018 | Seo | G06F 12/0646 |
| 2019/0065085 A1 | 2/2019 | Jean | |
| 2019/0121570 A1 | 4/2019 | Kim et al. | |
| 2019/0179741 A1* | 6/2019 | Liu | G11C 16/00 |
| 2019/0258581 A1* | 8/2019 | Lee | G06F 3/068 |
| 2019/0371409 A1* | 12/2019 | Brandt | G11C 16/16 |
| 2020/0014544 A1 | 1/2020 | Sela et al. | |
| 2020/0133847 A1* | 4/2020 | Venkatasubramanian | |
| | | | G06F 12/0804 |
| 2020/0210596 A1 | 7/2020 | Cariello et al. | |
| 2020/0218466 A1 | 7/2020 | Han et al. | |
| 2020/0218470 A1* | 7/2020 | Cho | G06F 3/0679 |
| 2020/0356669 A1* | 11/2020 | Kim | G06F 21/554 |
| 2021/0042220 A1* | 2/2021 | Gyllenskog | G06F 12/0246 |
| 2022/0012172 A1* | 1/2022 | Ostrovsky | G06F 12/0246 |
| 2023/0342077 A1* | 10/2023 | Li | G06F 3/0607 |

FOREIGN PATENT DOCUMENTS

| | | |
|---|---|---|
| CN | 108415663 A | 8/2018 |
| CN | 110176267 A | 8/2019 |
| TW | 201926351 A | 7/2019 |
| WO | 2020211070 A1 | 10/2020 |

OTHER PUBLICATIONS

Taiwan Search Report—TW110131603—TIPO—Nov. 25, 2024.
Related European Patent Application Ser. No. EP25153414, filed Aug. 19, 2021, EPO pub. No. EP4521229A2, European Search Report—European Search Authority—The Hague—Report Issued Apr. 8, 2025, 9 pages.

* cited by examiner

FLASH MEMORY LOCAL PURGE

CROSS-REFERENCE TO RELATED APPLICATION

The benefit of the filing date of U.S. Provisional Patent Application No. 63/075,435, filed Sep. 8, 2020, entitled "RAPID PURGE," is hereby claimed, and the specification thereof incorporated herein in its entirety by this reference.

DESCRIPTION OF THE RELATED ART

A computing device may include multiple subsystems that communicate with one another via buses or other interconnects. Such a computing device may be, for example, a portable computing device ("PCD"), such as a laptop or palmtop computer, a cellular telephone or smartphone, portable digital assistant, portable game console, etc. The communicating subsystems may be included within the same integrated circuit chip or in different chips. A "system-on-a-chip" or "SoC" is an example of one such chip that integrates numerous components to provide system-level functionality.

For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" that provides wireless connectivity, a main or system memory, one or more cache memories, etc. Some subsystems may include processing engines that may perform memory transactions with a memory. The system memory in PCDs and other computing devices commonly comprises dynamic random access memory ("DRAM"). In addition to DRAM, or alternatively to DRAM, a computing device may include non-volatile memory, such as flash memory.

A computing device may "delete" data, such as when a user requests deletion of a file, when an application program deletes temporary data that it no longer requires, etc. Nevertheless, deleting data in this manner does not physically remove the data from storage in the memory. Rather, deleting data in such a manner only causes the memory controller to de-map logical addresses by which the host (e.g., a processing engine) identifies the data from physical addresses identifying locations at which the data is physically stored in the memory. Such de-mapping, in conjunction with a process known as "garbage collection," enables the physical locations to be re-used. Nevertheless, it may be possible for a hacker or other party to retrieve deleted or otherwise de-mapped data (e.g., during a window after deletion but before garbage collection).

As confidential or otherwise sensitive data is commonly stored in the memories of PCDs and other computing devices, it is desirable to prevent retrieval of de-mapped data. "Purging" is a term that is commonly used to refer to physically eliminating data from a memory in a way that prevents the data from being retrieved. Purging flash memory is challenging because features known as write-leveling and garbage collection commonly result in multiple copies of data being distributed about the various physical "blocks." Flash memory may be purged by a host sending a purge command to a flash memory device. In response to the purge command, the flash memory device may purge all de-mapped blocks in the flash memory device. Flash memory also may be purged by performing a so-called "factory reset," in which all blocks of the memory are de-mapped, followed by a purge operation on the de-mapped blocks. Purging flash memory in this manner may take a substantial amount of time, which may inconvenience the user or otherwise be undesirable.

SUMMARY OF THE DISCLOSURE

Systems, methods, computer-readable media, and other examples are disclosed for purging data from a memory device.

An exemplary method for purging data from a memory device may include de-mapping logical memory blocks from physical memory blocks of a first storage partition of a plurality of storage partitions of the memory device. The exemplary method may also include listing de-mapped physical memory blocks of the first storage partition in a local de-mapped block list uniquely associated with the first storage partition. The exemplary method may further include receiving a local purge command from a host device. The exemplary method may still further include purging at least a portion of the de-mapped physical memory blocks listed only in the local de-mapped block list in response to the local purge command.

An exemplary system for purging data from a memory device may include a data storage medium and a controller coupled to the data storage medium. The controller may be configured to de-map logical memory blocks from physical memory blocks of a first storage partition of a plurality of storage partitions of the data storage medium. The controller may also be configured to list de-mapped physical memory blocks of the first storage partition in a local de-mapped block list uniquely associated with the first storage partition. The controller may further be configured to receive a local purge command from a host device. The controller may still further be configured to purge at least a portion of the de-mapped physical memory blocks listed only in the local de-mapped block list in response to the local purge command.

Another exemplary system for purging data from a memory device may include means for de-mapping logical memory blocks from physical memory blocks of a first storage partition of a plurality of storage partitions of the memory device. The exemplary system may also include means for listing de-mapped physical memory blocks of the first storage partition in a local de-mapped block list uniquely associated with the first storage partition. The exemplary system may further include means for receiving a local purge command from a host device. The exemplary system may still further include means for purging at least a portion of the de-mapped physical memory blocks listed only in the local de-mapped block list in response to the local purge command.

An exemplary computer-readable medium for purging data from a memory device may include a non-transitory computer-readable medium having instructions stored thereon in computer-executable form. The instructions when executed by a processor, may configure the processor to de-map logical memory blocks from physical memory blocks of a first storage partition of a plurality of storage partitions of the memory device.

The instructions may also configure the processor to list de-mapped physical memory blocks of the first storage partition in a local de-mapped block list uniquely associated with the first storage partition. The instructions may further configure the processor to receive a local purge command from a host device. The instructions may still further purge at least a portion of the de-mapped physical memory blocks listed only in the local de-mapped block list in response to the local purge command.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
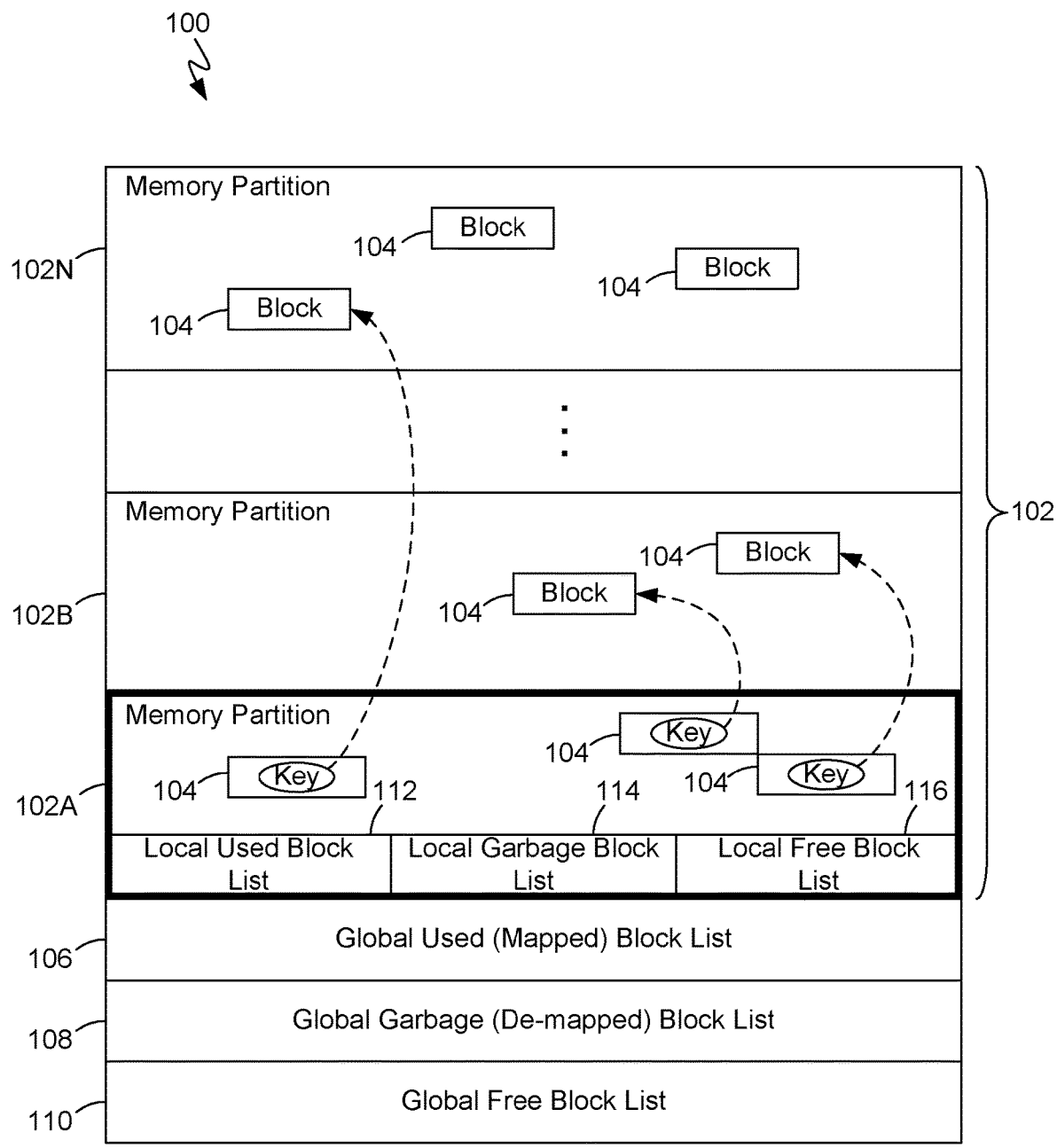
FIG. 1 is a memory map for a memory device, in accordance with exemplary embodiments.

As illustrated in FIG. 1, a memory map 100 represents storage space in a memory device (not shown). The memory map 100 may include partitions 102, such as a first partition 102A, a second partition 102B, etc., through an Nth partition 102N. The terms "first," "second," etc., are used herein only as an aid for referencing distinct elements and should not be construed as implying any location, order, sequence, etc. There may be any number (N) of partitions 102. The memory map 100 is depicted in a conceptual manner in FIG. 1 and is not intended to indicate actual memory addresses.

Data may be stored in the partitions 102 in locations that may be referred to herein as blocks 104. That is, each block 104 has a physical block address ("PBA") that may be used to write data to (i.e., physically store data in) or read data from (i.e., physically retrieve data from) that block 104. The illustrated blocks 104 are intended only as examples, and there may be any number of blocks 104 in any of the partitions 102.

The memory map 100 may also include regions relating to management of the blocks 104 in the first through Nth partitions 102A-102N: a global used block list 106, a global garbage block list 108, and a global free block list 110. Block "management" refers to processes by which blocks 104 may be made available for data storage, such as when data is stored in a block 104, after data is deleted, etc. Block management also involves moving information identifying the blocks 104, such as block addresses, from one of the lists 106-110 to another of the lists 106-110. For reasons described below, used blocks may also be referred to as mapped blocks, and garbage blocks may also be referred to as de-mapped blocks.

Figure 2:
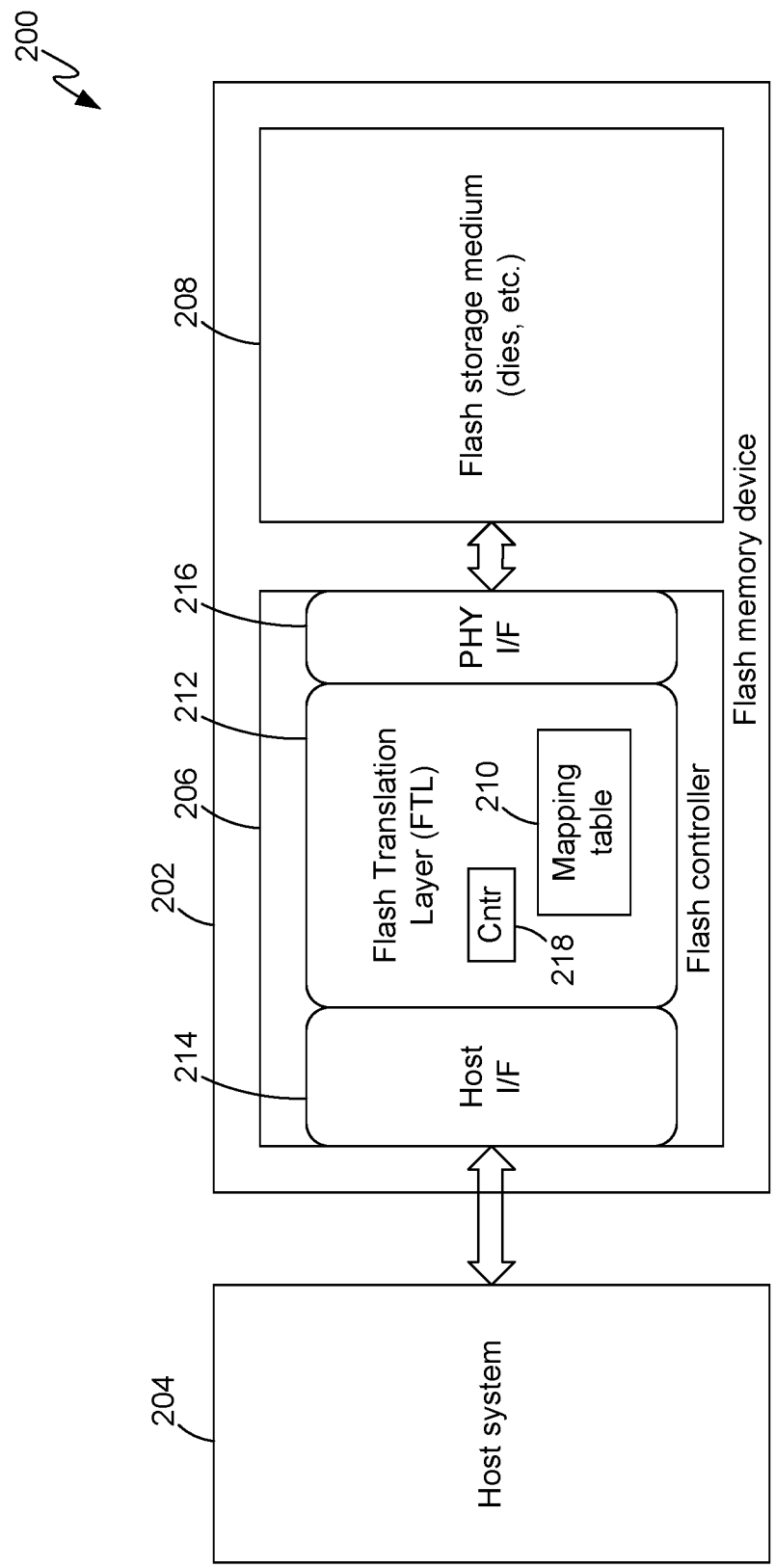
FIG. 2 is a block diagram of a system for purging data from a memory device, in accordance with exemplary embodiments.

In the exemplary embodiment illustrated in FIGS. 1-2, the memory map 100 may further include regions relating to management of the blocks 104 in the first partition 102A only: a local used block list 112 and a local garbage block list 114. A local free block list 116 may also be included. That is, while the global used block list 106, global garbage block list 108, and global free block list 110 are associated with all of the partitions 102A-102N in the illustrated embodiment, the local used block list 112, local garbage block list 114, and local free block list 116 are associated with only the first partition 102A in the illustrated embodiment. Nevertheless, in other embodiments such a memory map may omit the local free block list 116 and instead use the global free block list 110. A potential issue is that in embodiments utilizing the local free block list 116, excessive use of the local purge function described below could prematurely wear the memory locations, whereas wear leveling may mitigate such wear in embodiments omitting the local free block list 116 and utilizing only the global free block list 110.

As illustrated in FIG. 2, in a system 200 a flash memory device 202 is coupled to a host system 204. The host system 204 may be, for example, a computing device or portion thereof, such as a processor subsystem, processing engine, etc.

In the illustrated embodiment the flash memory device 202 has storage block management features and thus may be of a type commonly referred to as a "managed" memory device. Examples of managed memory devices include Universal Flash Storage ("UFS"), Embedded Multi-media Card ("eMMC"), Non-volatile Memory Express ("NVMe"), etc. Thus, in other embodiments of the system the memory device may be of any of the foregoing or other non-volatile, managed memory types. The flash memory device 202 may include a controller 206. The controller 206 may provide functions associated with a memory controller of a solid-state storage (e.g., flash memory) drive, including, for example, storage block management. The controller 206 may be configured to perform conventional functions associated with a memory controller of a flash memory drive, such as aspects relating to writing and reading data, as well as functions described below relating to purging de-mapped blocks. Conventional aspects of the flash memory device 202 that are well understood by one of ordinary skill in the art are not described in detail herein.

The flash memory device 202 may also include a flash data storage medium 208. As understood by one of ordinary skill in the art, the flash data storage medium 208 may comprise (not shown for purposes of clarity) one or more dies, each die having one or more planes, each plane having some number (commonly on the order of thousands but potentially any number) of blocks, and each block having some number (commonly on the order of dozens but potentially any number) of pages.

Data may be stored in the flash memory device 202 at the initiation of the host system 204, i.e., in response to a write request (command) issued by the host system 204. The write command may include one or more logical block addresses ("LBA"s) identifying locations in the host or "logical" address space at which the host system 204 requests the data be stored. When data is to be stored in the flash memory device 202, the controller 206 generates a mapping between each LBA and one or more PBAs. This mapping (of a block 104) may be stored in a mapping table 210 associated with a Flash Translation Layer ("FTL") 212 with which the controller 206 is configured (e.g., by software or firmware). A block 104 that has been mapped may also be referred to as a "used" block 104, i.e., the block 104 is in use. The controller 206 may add the LBA of each mapped block 104 to the global used block list 106 (FIG. 1).

The flash memory device 202 may also have a host interface 214 and a flash physical interface 216, which may comprise portions of the controller 206. Under control of the controller 206, data that is the subject of the write request may be stored in the storage medium 208 at locations corresponding to the PBAs of the mapping. Details of the manner by which data may be conveyed from the host system 204 to the storage medium 208 and stored therein under control of the controller 206 (e.g., via the host interface 214 and flash physical interface 216) are well understood by one of ordinary skill in the art and therefore not described herein.

The host system 204 may address the data that is the subject of read and write commands using LBAs. Although not shown for purposes of clarity, the portion of the host system 204 that allocates and de-allocates LBAs based on the operation of application programs or other software in operation is commonly referred to as a file system. The file system may be part of the operating system of the host system 204.

Commonly, the flash storage medium 208 is not over-writeable. Rather, data can only be stored in a block 104 (FIG. 1) that has been erased. An erased block may also be referred to as being in a "free" state. Blocks 104 that have been erased may be listed in the global free list 110 (FIG. 1). In embodiments in which the flash storage medium is over-writable, blocks may be listed in the global free list 110 without first erasing them. In generating the above-described mapping in response to a write command, the controller 206 may select a PBA from the global free list 110.

As understood by one of ordinary skill in the art, physical locations in the storage medium 208 have a limited lifespan. That is, after some number of accesses (e.g., Erase and Program flash memory commands), each location will be worn to an extent that it may no longer function properly. To mitigate this "wear" effect, a flash memory controller may run a process known as wear leveling. In accordance with wear leveling, the controller 206 may attempt to distribute data evenly over all blocks 104 to avoid wearing some blocks 104 more than others. Wear-leveling, like the above-described mapping, is another function of the FTL 212.

Data stored in the flash memory device 202 may be deleted from the perspective of the host system 204. To delete data in this manner, the host system 204 may issue a Write or Erase command to the flash memory device 202. The Write or Erase command may include one or more LBAs identifying locations from which the host system 204 requests the data to be deleted. In response to a Write or Erase command, the controller 206 may remove the mappings between one or more PBAs and LBAs from the mapping table 210. For clarity, a command issued by the host system 204 that causes the controller 206 to remove such mappings (e.g., a Write or Erase command) may be referred to in this disclosure as a "de-map" command. The controller 206 may also move the PBA of each de-mapped block 104 (FIG. 1) from the global used block list 106 to the global garbage block list 108.

In a process commonly referred to as garbage collection, the controller 206 may sometimes move data (pages) in blocks 104 listed in the global used block list 106 to other blocks 104 and update the mapping table 210 accordingly. The goal of such movement of data is to remove some of the blocks 104 from use, so that those blocks 104 no longer in use can be erased and then re-used to store new data. When a block 104 no longer contains data that is in use, the controller 206 may move the PBA of that block 104 from the global used block list 106 to the global garbage block list 108. The controller 206 may erase the blocks 104 listed in the global garbage block list 108 and move the PBAs of the erased blocks 104 to the global free block list 110. Garbage collection, like the above-described mapping, is another function of the FTL 212. The controller 206 may perform garbage collection in the background, i.e., at times during which the host system 204 is not interacting with the flash memory device 202.

For security reasons, it may be desirable to prevent retrieval of de-mapped data (i.e., data that is invalid or no longer in use) from the storage medium 208. Although the above-described de-mapping prevents the host system 204 from accessing the data (addressed by LBAs), such de-mapping does not affect the physical state of the data in the storage medium 208. Absent the purge-related features described below, it may be possible for a hacker or other party to retrieve de-mapped data from the storage medium 208 using, for example, a software tool (i.e., software other than the file system of the host system 204).

Terms such as "sanitizing," "wiping," etc. commonly refer to eliminating physical manifestations of de-mapped data from a memory to prevent the data from being retrieved. Performing such operations on flash memory may be challenging because, among other reasons, operation of the above-described wear leveling, garbage collection, etc., features may result in multiple copies of the same data distributed about the storage medium 208.

Managed flash devices, such as UFS devices, may implement a Purge command, which may be referred to herein as a global Purge command to distinguish it from a local purge command that is described below. In response to a global Purge command issued by the host system 204, the controller 206 may erase all de-mapped blocks 104. Managed flash devices also may implement a Format Unit command. In response to a Format Unit command issued by the host system 204, the controller 206 may erase all de-mapped blocks 104 (e.g., in response to an Erase command) and then write various data values, such as all zeroes, all ones, random numbers, etc., to the erased blocks 104 to obscure any remaining physical manifestations of the originally stored data. The controller 206 may move the PBAs of purged blocks 104 from the global garbage block list 108 to the global free block list 110.

When the global garbage block list 108 contains many de-mapped blocks 104, purging them in the manner described above in response to a global Purge command or a Format Unit command may be time-consuming. A global purge operation as described above may take, for example, an amount of time on the order of hours. To provide a faster purge operation than the global purge operation, the device 202 may be provided with the following local purge feature in addition to, or alternatively to, the global purge feature described above.

At least one of the partitions 102, which may be referred to as a "special" or "local" partition, may have one or more characteristics that are different from other partitions 102. In the illustrated embodiment, the first partition 102A may be the special or local partition, as depicted in FIG. 1 by a border in bold line. In the illustrated embodiment, the special characteristics of the first partition 102A include the local used block list 112, the local garbage block list 114, and the local free block list 116. As noted above, in some embodiments the local free block list 116 may be omitted. In the illustrated embodiment, partitions 102 other than the first partition 102A do not include such a local used block list, local garbage block list or local free block list.

The special or local partition, such as the first partition 102A in the illustrated embodiment, may be, for example, a Replay-Protected Memory Block ("RPMB"). An RPMB is a type of authenticated-access partition. An entity (e.g., host system 204) may only be granted access to an authenticated-access partition, such as an RPMB, when authentication of the entity is successful. Nevertheless, in other embodiments the special partition may be any partition (sometimes also referred to as a Logical Unit) of the storage medium.

To provide the local purge feature, the controller 206 may be configured (e.g., by software or firmware) to respond to a local purge command received from the host system 204 in a manner similar to the above-described manner in which the controller 206 responds to a global purge command. However, in an exemplary embodiment, unlike the global purge operation, which purges all blocks 104 (FIG. 1) listed in the global garbage block list 108, the local purge operation purges only the blocks 104 listed in the local garbage block list 114. Thus, in this exemplary embodiment, unlike the global purge operation, which may purge blocks 104 in any of the first through Nth partitions 102A-102N, the local purge operation may purge blocks 104 in only the first partition 102A and not purge any blocks in any of the second through Nth partitions 102B-102N. The local purge operation may comprise the controller 206 erasing all blocks 104 listed in the local garbage block list 114. The local purge operation may also comprise the controller writing various data values, such as all zeroes, all ones, random numbers, etc., to those erased blocks 104 to obscure any remaining physical manifestations of the originally stored data. The controller 206 may move the PBAs of purged blocks 104 from the local garbage block list 114 to the global free block list 110 (or, in some embodiments, to the local free block list 116). The local purge operation may be completed within a substantially shorter amount of time than a global purge operation because the local purge operation is confined to the special partition (e.g., the first partition 102A in this exemplary embodiment).

The controller 206 may be configured to perform garbage collection in the first partition 102A in a manner similar to the above-described manner in which the controller 206 may perform garbage collection in partitions 102 in general. That is, the controller 206 may sometimes move data (pages) in blocks 104 listed in the local used block list 112 to other blocks 104 in the first partition 102A and update the mapping table 210 accordingly, with the goal of removing some of the blocks 104 in the first partition 102A from use. When a block 104 listed in the local used block list 112 no longer contains data that is in use, the controller 206 may move the PBA of that block 104 from the local used block list 112 to the local garbage block list 114. The controller 206 may erase the blocks 104 listed in the local garbage block list 114 and move the PBAs of those erased blocks 104 to the global free block list 110 (or, in some embodiments, to the local free block list 116).

Note that while both garbage collection and purge operations involve erasing blocks 104, garbage collection commonly results in only a fraction of the de-mapped blocks 104 being erased at a time. In contrast, a purge operation may erase all de-mapped blocks 104: a global purge operation may erase all de-mapped blocks 104 listed in the global garbage block list 108, and a local purge operation may erase only de-mapped blocks 104 listed in the local garbage block list 114.

Write operations directed to the first partition 102A may be performed in a manner similar to the manner described above with regard to any of the partitions 102, except that block management operations associated with the first partition 102A may use the local used block list 112 and local garbage block list 114 instead of the global used block list 106 and global garbage block list 108, respectively. In some embodiments, the local free block list 116 may be used instead of, or in addition to, the global free block list 110. Accordingly, in response to receiving a write request (command) from the host system 204, the controller 206 may select one or more blocks 104 listed in the global free block list 110 (as identified by PBA), generate a mapping between each LBA and the one or more PBAs, store the one or more mappings in the mapping table 210, store the data that is the subject of the write request in the storage medium 208, and add the PBA of each mapped block 104 to the local used block list 112. As noted above, in the exemplary embodiment a prerequisite or condition of completing a write operation or other access in the first partition 102A is successful authentication of the host system 204. Nevertheless, in other embodiments, the special partition may not be an authenticated-access block, and authentication thus may not be required for a host system to access the special partition in such other embodiments.

Figure 3:
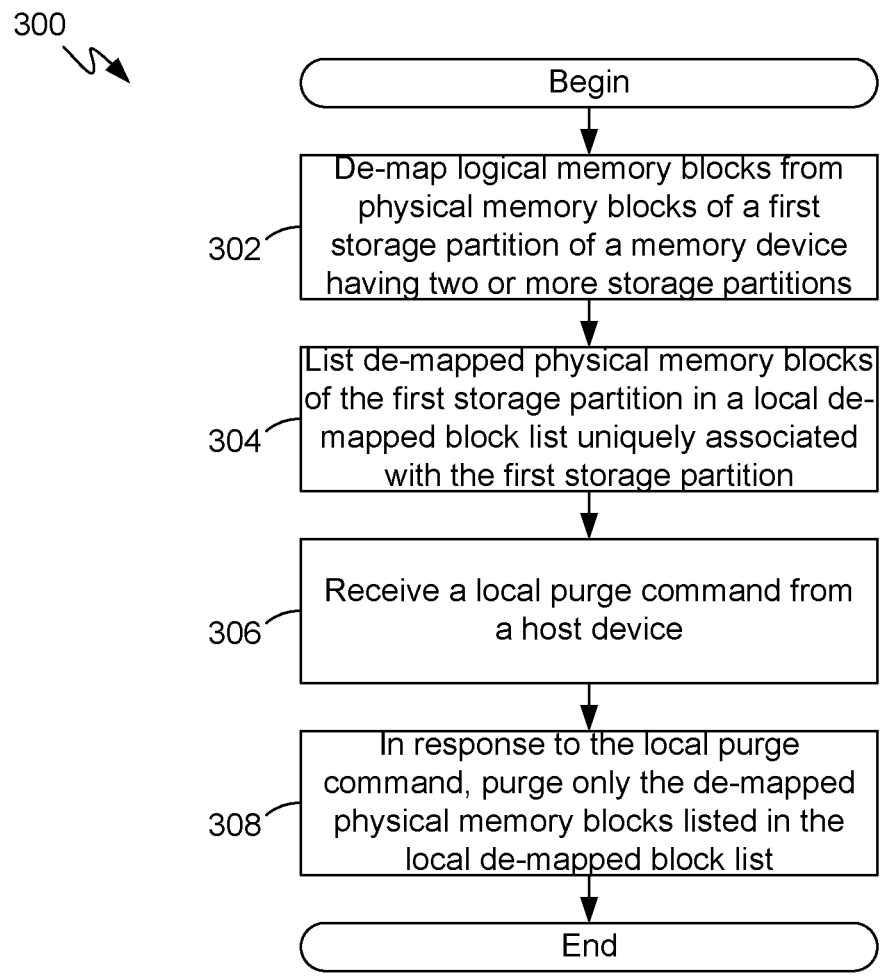
FIG. 3 is a flow diagram of a method for purging data from a memory device, in accordance with exemplary embodiments.

In FIG. 3, a method 300 for purging data from a memory device having two or more storage partitions is illustrated in flow diagram form. As indicated by block 302, LBAs may be de-mapped from physical memory blocks of a storage partition of the memory device. This storage partition may be, for example, a special partition as described above with regard to FIG. 2 (e.g., the first partition 102A). As indicated by block 304, de-mapped physical memory blocks of that storage partition may be listed in a local de-mapped block list uniquely associated with that storage partition. As indicated by block 306, a local purge command may be received from a host device. As indicated by block 308, in response to the local purge command, only the de-mapped physical memory blocks listed in the local de-mapped block list may be purged. That is, de-mapped physical memory blocks listed in any other de-mapped block list, such as a global de-mapped block list, may not be purged in response to this local type of purge command. In some embodiments, the method 300 may be provided in addition to a method (not shown) by which de-mapped physical memory blocks listed in a global de-mapped block list, covering all partitions of the memory device, may be purged. It should be understood that although blocks 302-308 are described above in an exemplary order conducive to guiding the reader through an example of the method 300, the actions described above in association with blocks 302-308 may occur in any order that produces the same or similar results.

Conveniently, the local purge feature may be used to, in effect, purge encrypted data stored in the second through Nth partitions 102B-102N. This feature is sometimes referred to as a cryptographic purge. Although a local purge operation may only actually purge data blocks 104 in the first partition 102A, in an embodiment in which the data blocks 104 in the first partition 102A are used to store key information associated with encrypted data stored in data blocks 104 in any of the second through Nth partitions 102B-102N, purging the key information in effect purges data encrypted in association with the key information. In FIG. 1, encryption of data in some exemplary data blocks 104 in the second through Nth partitions 102B-102N by key information in other exemplary data blocks 104 in the first partition 102A is conceptually indicated by broken-line arrows. The encryption keys may be stored in an encrypted form by a technique sometimes referred to as key wrapping.

Figure 4:
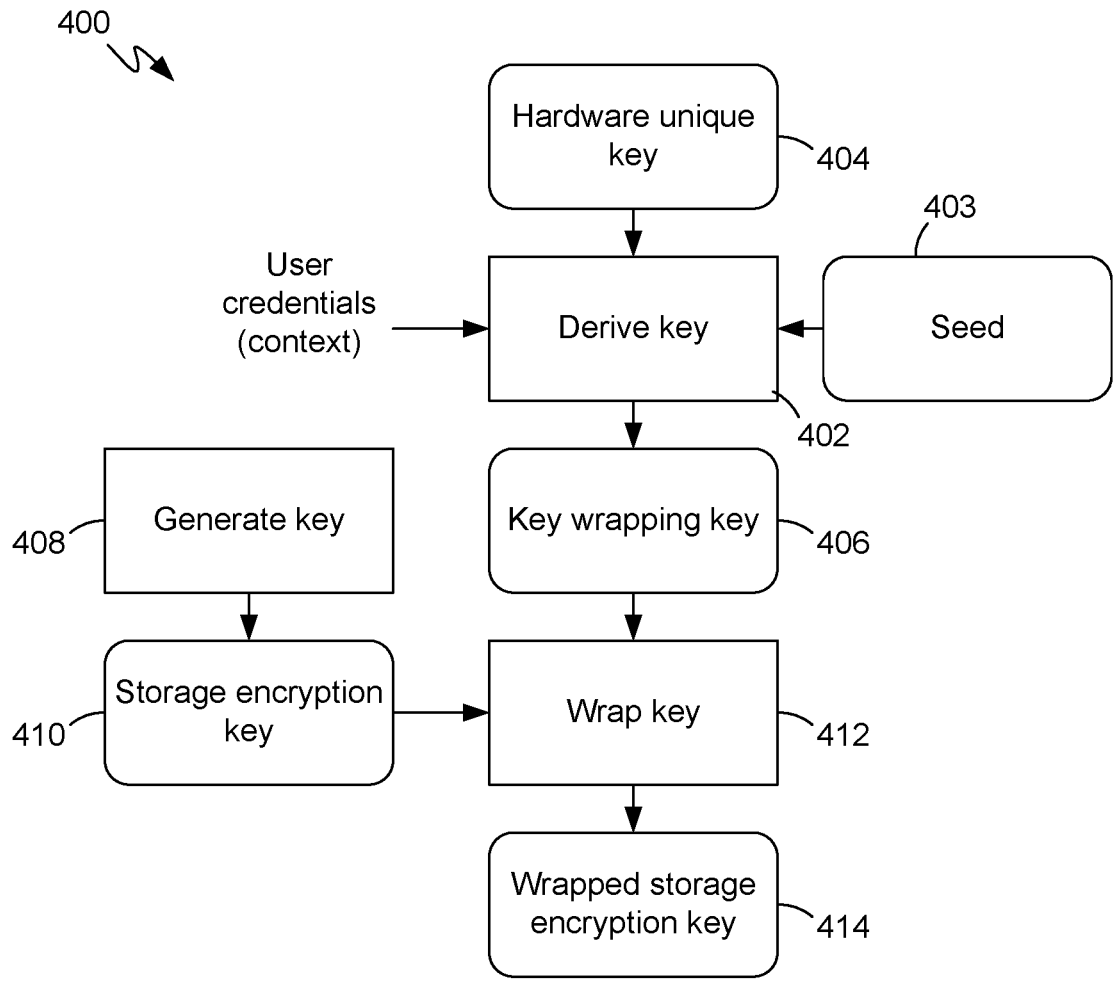
FIG. 4 is a key wrapping scheme diagram, in accordance with exemplary embodiments.

As illustrated in FIG. 4, a key wrapping scheme 400 may involve several types of keys and several operations or functions. The key wrapping scheme 400 may be provided in the host system 204 (FIG. 2). A key derivation function 402 may operate upon inputs comprising a seed 403 (i.e., a randomly generated number), a unique hardware key 404 and user credentials (or context) to produce a key wrapping key 406. A key generator 408 may produce a (random) storage encryption key 410. A key wrapping function 412 may operate upon inputs comprising the key wrapping key 406 and the storage encryption key 410 to produce a wrapped storage encryption key 414. The wrapped storage encryption key 414 and the seed 403 may be stored in a block 104 in a form sometimes referred to as a binary large object or "blob." The above-referenced "key information" may include the wrapped storage encryption key 414, the seed 403 to that key 414, or other information that may enable recovery of the encrypted data. In an exemplary embodiment, all of the data stored in blocks 104 in the partitions 102B-102N may be encrypted by keys (in the form of key blobs, for example) stored in blocks 104 in the first partition 102A. In such an embodiment, purging the first partition 102A, containing the key information, in effect (or from a cryptographic perspective) purges all of the partitions 102A-102N because the data cannot be retrieved without the key information. As noted above, purging only the first partition 102A may be substantially faster than purging all of the partitions 102A-102N.

Figure 5:
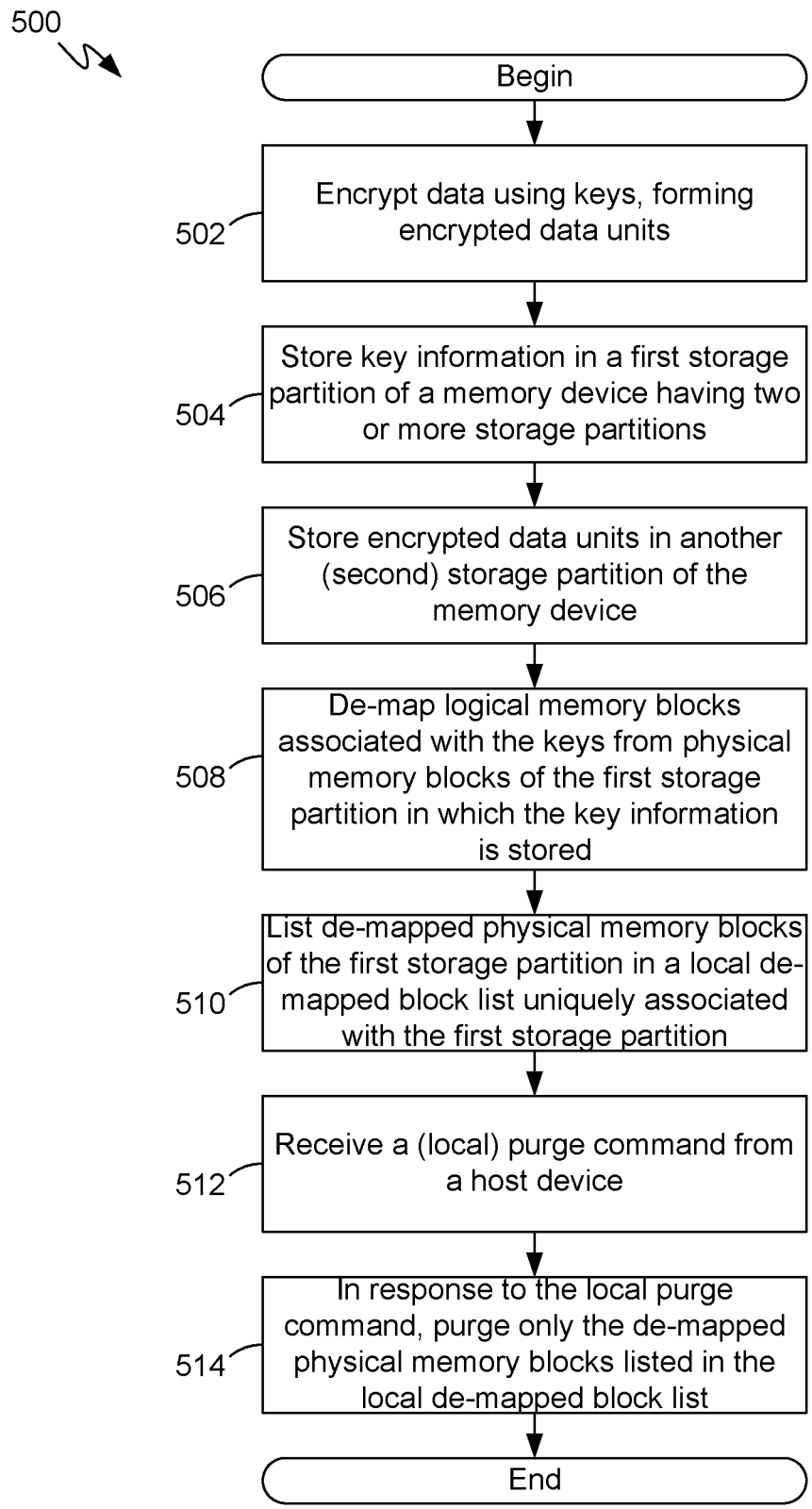
FIG. 5 is a flow diagram of another method for purging data from a memory device, in accordance with exemplary embodiments.

In FIG. 5, a method 500 for purging data from a memory device having two or more storage partitions is illustrated in flow diagram form. As indicated by block 502, data may be encrypted using corresponding keys to form encrypted data units. As indicated by block 504, the key information may be stored in a first storage partition. This first storage partition may be, for example, a special partition as described above with regard to FIG. 2 (e.g., the first partition 102A), in contrast with some other (second, third, etc.) storage partition of the memory device. As indicated by block 506, the encrypted data units may be stored in another (second) storage partition of the memory device.

As indicated by block 508, logical memory blocks associated with the keys may be de-mapped from physical memory blocks in which the key information was stored (block 504). As indicated by block 510, de-mapped physical memory blocks of the first storage partition may be listed in a local de-mapped block list uniquely associated with the first storage partition. As indicated by block 512, a local purge command may be received from a host device. As indicated by block 514, in response to the local purge command, only the de-mapped physical memory blocks listed in the local de-mapped block list (and thus including de-mapped physical memory blocks in which the key information was stored) may be purged. That is, de-mapped physical memory blocks listed in any other de-mapped block list, such as a global de-mapped block list, may not be purged in response to the local purge command. In some embodiments, the method 500 may be provided in addition to a method (not shown) by which de-mapped physical memory blocks listed in a global de-mapped block list covering all partitions of the memory device may be purged. It should be understood that although blocks 502-514 are described above in an exemplary order conducive to guiding the reader through an example of the method 500, the actions described above in association with blocks 502-514 may occur in any order that produces the same or similar results.

Figure 6:
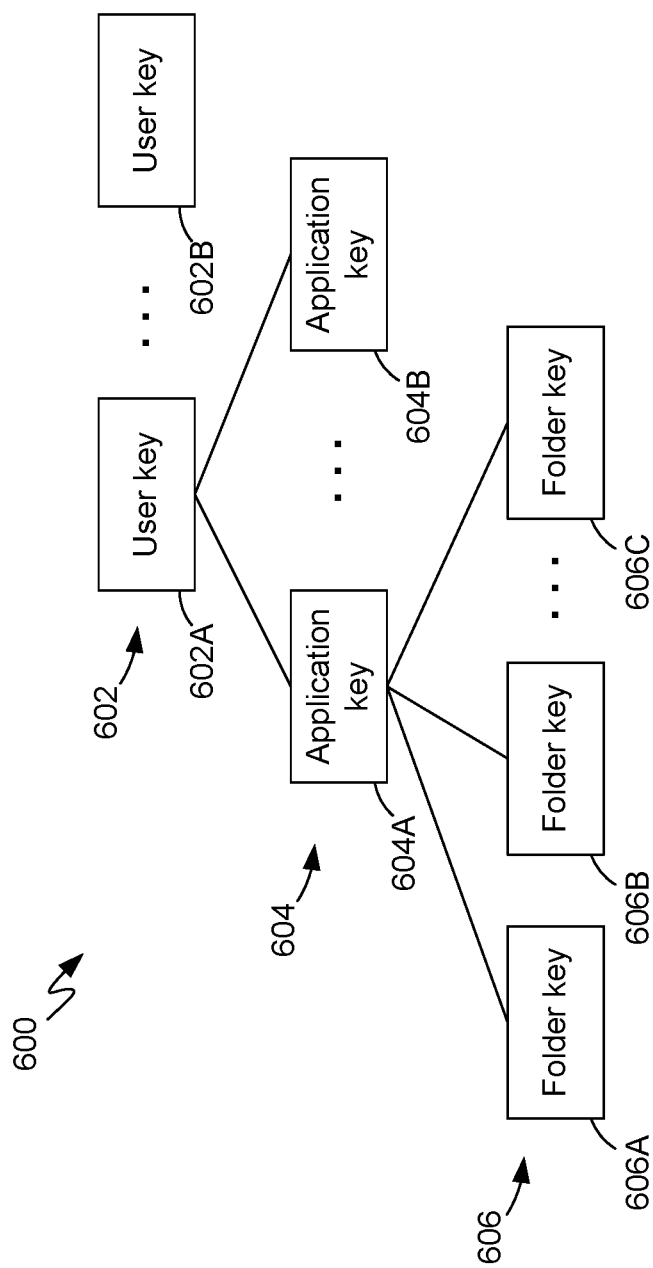
FIG. 6 is a key hierarchy diagram, in accordance with exemplary embodiments.

In FIG. 6, a key hierarchy 600 illustrates that the above-referenced keys may be of any type. For example, the above-referenced keys may be any of: a user key 602 (e.g., a first user key 602A associated with a first user, a second user key 602B associated with a second user, etc.); an application-specific key 604 (e.g., a first application-specific key 604A associated with a first application program, a second application-specific key 604B associated with a second application program, etc.); or a folder key 606 (e.g., a first folder key 606A associated with a first folder of the first application program, a second folder key 606B associated with a second folder of the first application program, etc.).

The key hierarchy 600 may be maintained in the above-described special partition of the memory device by a key management system (not shown) of the host system 204 (FIG. 2). Each user key 602 may be unique to a user of the application programs on the host system 204. The key management system may use a user key 602 to wrap an application-specific key 604, and may use an application-specific key 604 to wrap a folder key 606. When an application program deletes a folder protected by a folder key 606, the key management system may generate a new application-specific key 604 and re-wrap all the associated folder keys 606. When a different user requires access to the application programs, the key management system may use that user's user key 602 to wrap the application-specific keys 604. When a user no longer requires access to the application programs, the key management system may remove that user's user key 602 from the special partition in which keys are stored. Removing a key from the special partition may comprise de-mapping the block containing the key. The key management system may purge the special partition (thus purging all de-mapped keys) in the manner described above. The key management system may purge the special partition at any time, such as, for example, hourly, daily, etc., or when a block containing a key is de-mapped.

A purge count feature may be included in some embodiments, such as an embodiment in which a local free block list is utilized instead of the global free block list. Referring again to FIG. 2, the key management system (not shown) of the host system 204 may determine how frequently to purge the special partition based on the number of lifetime erase cycles of which the flash storage medium 208 (FIG. 2) is capable and the total number of purge operations that the special partition has undergone. The flash memory device 202 may include a purge counter 218. The controller 206 may increment the purge counter 218 each time the controller 206 performs a purge operation on the special partition. In response to a local purge command received from the host system 204, the controller 206 may not only perform the purge operation but also return the purge count or value in the purge counter 218 to the host system 204. Based on that purge count (or the purge count in combination with other information, such as the number of lifetime erase cycles of which the flash memory device is capable) the key management system may determine when to initiate the next purge operation.

Figure 7:
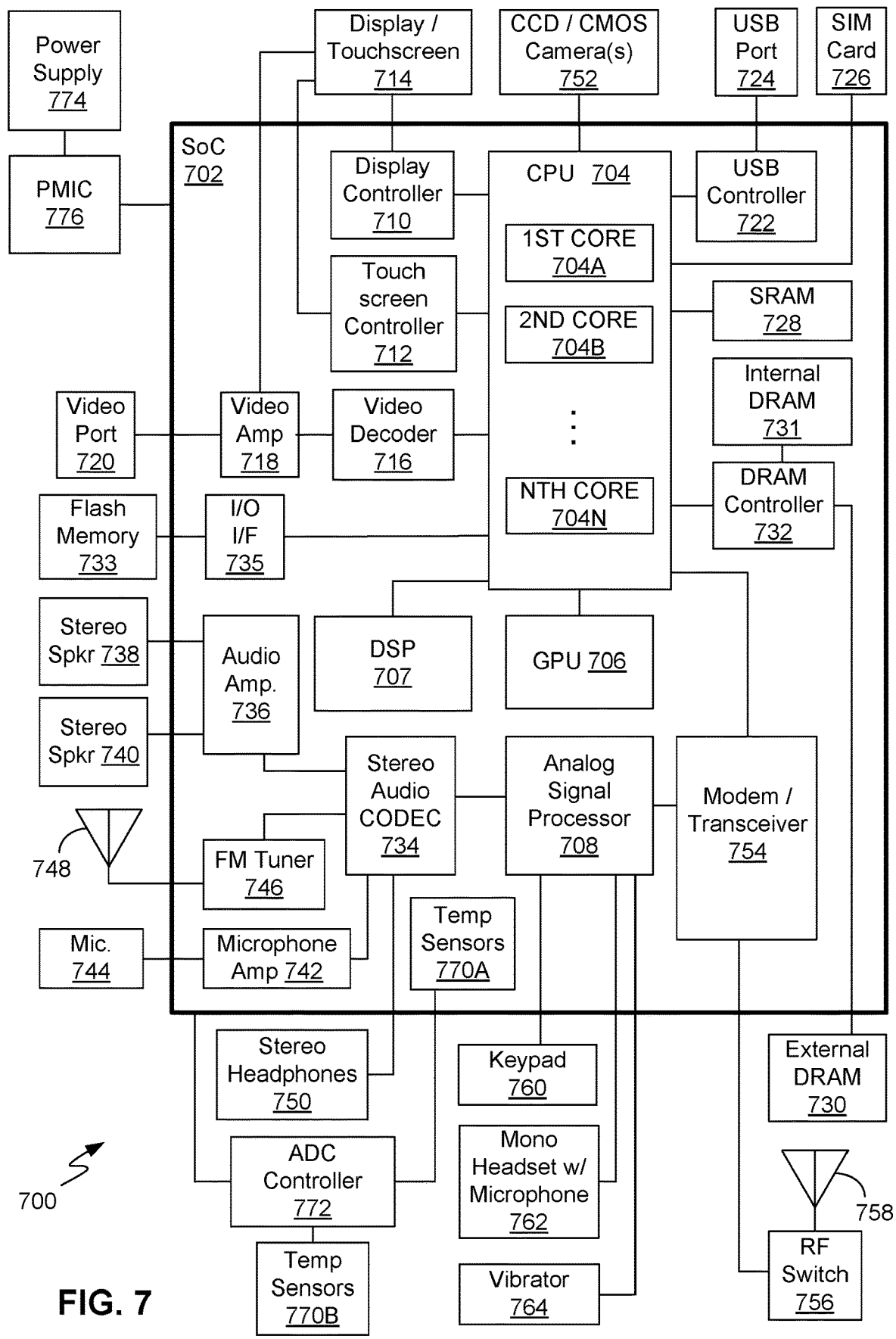
FIG. 7 is a block diagram of a portable computing device, in accordance with exemplary embodiments.

As illustrated in FIG. 7, exemplary embodiments of systems and methods for purging data from a memory device may be provided in a portable computing device ("PCD") 700. For purposes of clarity, data buses or other data communication interconnects are not shown in FIG. 7. Some exemplary interconnections, some of which may represent communication via such buses or interconnects, are described for context. Nevertheless, it should be understood that, more generally, various elements described below may communicate with each other via one or more buses or system interconnects.

The PCD 700 may include an SoC 702. The SoC 702 may include a CPU 704, a GPU 706, a DSP 707, an analog signal processor 708, or other processors. The CPU 704 may include multiple cores, such as a first core 704A, a second core 704B, etc., through an Nth core 704N.

A display controller 710 and a touch-screen controller 712 may be coupled to the CPU 704. A touchscreen display 714 external to the SoC 702 may be coupled to the display controller 710 and the touch-screen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A universal serial bus ("USB") controller 722 may also be coupled to CPU 704, and a USB port 724 may be coupled to the USB controller 722. A subscriber identity module ("SIM") card 726 may also be coupled to the CPU 704.

One or more memories may be coupled to the CPU 704. The one or more memories may include both volatile and non-volatile memories. Examples of volatile memories include static random access memory ("SRAM") 728 and dynamic RAMs ("DRAM"s) 730 and 731. Such memories may be external to the SoC 702, such as the DRAM 730, or internal to the SoC 702, such as the DRAM 731. A DRAM controller 732 coupled to the CPU 704 may control the writing of data to, and reading of data from, the DRAMs 730 and 731. In other embodiments, such a DRAM controller may be included within a processor, such as the CPU 704.

The PCD 700 may include a flash memory device 733, such as a chip that is coupled to the SoC 702. The flash memory device 733 may be coupled to the CPU 704 via, for example, an input/output ("I/O") interface 735. The I/O interface 735 may comprise a bus, such as, for example, a peripheral component interconnect express ("PCIe") bus, or any other type of interconnection with the CPU 704. The flash memory device 733 may be an example of the flash memory device 202 described above with regard to FIG. 2. Although in this embodiment the flash memory device 202 includes the controller 206 (FIG. 2), in other embodiments such a controller may be included in the SoC. The CPU 704 and related components may be configured to provide the host system functions described above.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

A modem or RF transceiver 754 may be coupled to the analog signal processor 708 and the CPU 704. An RF switch 756 may be coupled to the RF transceiver 754 and an RF antenna 758. In addition, a keypad 760, a mono headset with a microphone 762, and a vibrator device 764 may be coupled to the analog signal processor 708.

The SoC 702 may have one or more internal or on-chip thermal sensors 770A and may be coupled to one or more external or off-chip thermal sensors 770B. An analog-to-digital converter ("ADC") controller 772 may convert voltage drops produced by the thermal sensors 770A and 770B to digital signals. A power supply 774 and a power management integrated circuit ("PMIC") 776 may supply power to the SoC 702.

Firmware or software may be stored in any of the above-described memories, such as DRAM 730 or 731, SRAM 728, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Figure 8:
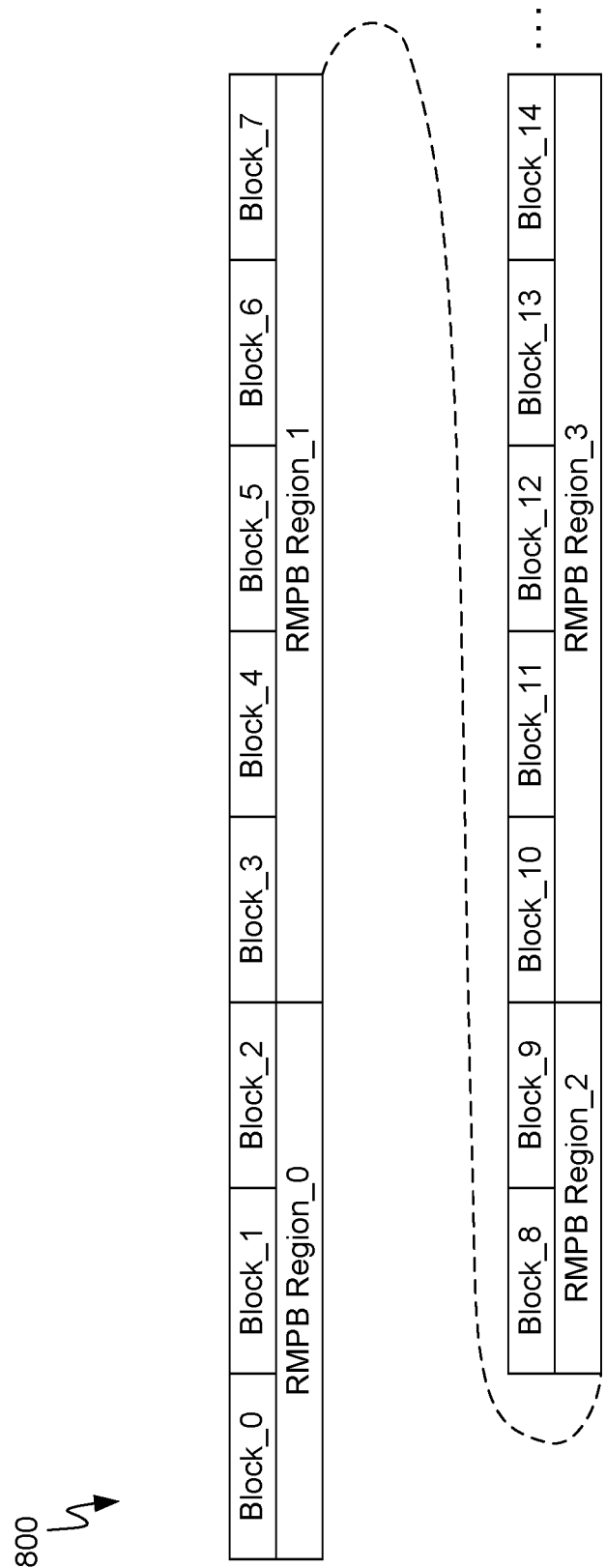
FIG. 8 is a conceptual illustration of a local purge command, in accordance with exemplary embodiments.

The above-described local Purge command may be included in a set of commands covered by a flash memory standard, such as, for example a UFS standard. The local Purge command may be included in the (e.g., UFS) command set in addition to the above-described global Purge command. An example 800 of a local Purge command is shown in conceptual form in FIG. 8. As described above, the special or local partition may be the RPMB. In contrast with the global Purge command, which may take no arguments, the local Purge command may take arguments that specify a region within the local partition (i.e., a subset of the RPMB blocks). For example, the host could set the value of an argument to identify any of: a first region (RMPB Region_0) that spans blocks 0 through 2 of the RPMB; a second region (RMPB Region_1) that spans blocks 3 through 7 of the RPMB; a third region (RMPB Region_2) that spans blocks 8 through 9 of the RPMB; a fourth region (RMPB Region_3) that spans blocks 10 through 14 of the RPMB; etc. The regions shown in FIG. 8 are intended only as examples and, using the local Purge command arguments, a host could define any group of blocks as such a region. In response to a local Purge command received from a host, a flash memory device, such as a UFS device, may purge only those blocks identified by the values of the arguments in the local Purge command. In this manner, a host may purge all or only a subset of the blocks in the local partition (e.g., RPMB).

Alternative embodiments will become apparent to one of ordinary skill in the art to which this disclosure pertains. Therefore, although selected aspects have been illustrated and described in detail, it will be understood that various substitutions and alterations may be made therein.

Implementation examples are described in the following numbered clauses:

1. A method for purging data from a memory device, comprising:
   de-mapping logical memory blocks from physical memory blocks of a first storage partition of a plurality of storage partitions of the memory device;
   listing de-mapped physical memory blocks of the first storage partition in a local de-mapped block list uniquely associated with the first storage partition;
   receiving a local purge command from a host device; and purging at least a portion of the de-mapped physical memory blocks listed in the local de-mapped block list in response to the local purge command.

2. The method of clause 1, wherein the memory device is non-volatile.

3. The method of any of clauses 1-2, wherein the first storage partition is an authenticated-access partition.

4. The method of any of clauses 1-3, wherein the first storage partition is a Replay Protected Memory Block.

5. The method of any of clauses 1-4, further comprising listing purged physical memory blocks in a local free block list, wherein the local free block list is uniquely associated with the first storage partition.

6. The method of any of clauses 1-5, wherein a global de-mapped block list and a global free block list are associated with the plurality of storage partitions other than the first storage partition, and further comprising receiving a global purge command from the host device and purging all de-mapped physical memory blocks listed in the global-de-mapped block list in response to the global purge command.

7. The method of any of clauses 1-6, further comprising:
forming a plurality of units of encrypted data using a corresponding plurality of keys;
storing key information associated with the plurality of keys in the first storage partition; and
storing the plurality of units of encrypted data in a second storage partition of the plurality of storage partitions;
wherein de-mapping logical memory blocks from physical memory blocks of the first storage partition comprises de-mapping logical memory blocks associated with the plurality of keys from physical memory blocks storing the key information;
wherein purging the de-mapped physical memory blocks listed in the local de-mapped block list comprises purging physical memory blocks storing the key information.

8. The method of any of clauses 1-7, further comprising:
providing a purge count to the host system in response to the local purge command; and
incrementing the purge count in response to the local purge command.

9. The method of any of clauses 1-8, wherein receiving the local purge command comprises receiving an indication of the portion of the de-mapped physical memory blocks to purge.

10. A system for purging data from a memory device, comprising:
a data storage medium; and
a controller coupled to the data storage medium, the controller configured to:
de-map logical memory blocks from physical memory blocks of a first storage partition of a plurality of storage partitions of the data storage medium;
list de-mapped physical memory blocks of the first storage partition in a local de-mapped block list uniquely associated with the first storage partition;
receive a local purge command from a host device; and
purge at least a portion of the de-mapped physical memory blocks listed in the local de-mapped block list in response to the local purge command.

11. The system of clause 10, wherein the data storage medium is non-volatile.

12. The system of any of clauses 10-11, wherein the first storage partition is an authenticated-access partition.

13. The system of any of clauses 10-12, wherein the first storage partition is a Replay Protected Memory Block.

14. The system of any of clauses 10-13, wherein the controller is further configured to list purged physical memory blocks in a local free block list, wherein the local free block list is uniquely associated with the first storage partition.

15. The system of any of clauses 10-14, wherein a global de-mapped block list and a global free block list are associated with the plurality of storage partitions other than the first storage partition, and the controller is further configured to receive a global purge command from the host device and to purge all de-mapped physical memory blocks listed in the global-de-mapped block list in response to the global purge command.

16. The system of any of clauses 10-15, wherein the controller is further configured to:
form a plurality of units of encrypted data using a corresponding plurality of keys;
store key information associated with the plurality of keys in the first storage partition; and
store the plurality of units of encrypted data in a second storage partition of the plurality of storage partitions;
wherein the controller is configured to de-map logical memory blocks from physical memory blocks of the first storage partition by being configured to de-map logical memory blocks associated with the plurality of keys from physical memory blocks storing the key information;
wherein the controller is configured to purge the de-mapped physical memory blocks listed in the local de-mapped block list by being configured to purge physical memory blocks storing the key information.

17. The system of any of clauses 10-16, wherein the controller is further configured to:
provide a purge count to the host system in response to the local purge command; and
increment the purge count in response to the local purge command.

18. The system of any of clauses 10-17, wherein the local purge command comprises an indication of the portion of the de-mapped physical memory blocks to purge.

19. A system for purging data from a memory device, comprising:
means for de-mapping logical memory blocks from physical memory blocks of a first storage partition of a plurality of storage partitions of the memory device;
means for listing de-mapped physical memory blocks of the first storage partition in a local de-mapped block list uniquely associated with the first storage partition;
means for receiving a local purge command from a host device; and
means for purging at least a portion of the de-mapped physical memory blocks listed in the local de-mapped block list in response to the local purge command.

20. The system of clause 19, wherein the memory device is non-volatile.

21. The system of any of clauses 19-20, wherein the first storage partition is an authenticated-access partition.

22. The system of any of clauses 19-21, wherein the first storage partition is a Replay Protected Memory Block.

23. The system of any of clauses 19-22, further comprising means for listing purged physical memory blocks in a local free block list, wherein the local free block list is uniquely associated with the first storage partition.

24. The system of any of clauses 19-23, wherein a global de-mapped block list and a global free block list are associated with the plurality of storage partitions other than the first storage partition, the means for receiving is further for receiving a global purge command from the host device, and the means for purging is further for purging all de-mapped physical memory blocks listed in the global-de-mapped block list in response to the global purge command.

25. The system of any of clauses 19-24, further comprising:
means for forming a plurality of units of encrypted data using a corresponding plurality of keys;
means for storing key information associated with the plurality of keys in the first storage partition; and
means for storing the plurality of units of encrypted data in a second storage partition of the plurality of storage partitions;
wherein the means for de-mapping logical memory blocks from physical memory blocks of the first storage partition comprises means for de-mapping logical memory blocks associated with the plurality of keys from physical memory blocks storing the key information;
wherein the means for purging the de-mapped physical memory blocks listed in the local de-mapped block list comprises means for purging physical memory blocks storing the key information.

26. The system of any of clauses 19-25, further comprising:
means for providing a purge count to the host system in response to the local purge command; and
means for incrementing the purge count in response to the local purge command.

27. The system of any of clauses 19-26, wherein the local purge command comprises an indication of the portion of the de-mapped physical memory blocks to purge.

28. A computer-readable medium for purging data from a memory device, comprising a non-transitory computer-readable medium having stored thereon in computer-executable form instructions that, when executed by a processor, configure the processor to:
de-map logical memory blocks from physical memory blocks of a first storage partition of a plurality of storage partitions of the memory device;
list de-mapped physical memory blocks of the first storage partition in a local de-mapped block list uniquely associated with the first storage partition;
receive a local purge command from a host device; and
purge at least a portion of the de-mapped physical memory blocks listed in the local de-mapped block list in response to the local purge command.

29. The computer-readable medium of clause 28, wherein the memory device is non-volatile.

30. The computer-readable medium of any of clauses 28-29, wherein the first storage partition is an authenticated-access partition.

31. The computer-readable medium of any of clauses 28-30, wherein the first storage partition is a Replay Protected Memory Block.

32. The computer-readable medium of any of clauses 28-31, wherein the instructions further configure the processor to list purged physical memory blocks in a local free block list, wherein the local free block list is uniquely associated with the first storage partition.

33. The computer-readable medium of any of clauses 28-32, wherein a global de-mapped block list and a global free block list are associated with the plurality of storage partitions other than the first storage partition, and the instructions further configure the processor to receive a global purge command from the host device and to purge all de-mapped physical memory blocks listed in the global-de-mapped block list in response to the global purge command.

34. The computer-readable medium of any of clauses 28-33, wherein the instructions further configure the processor to:
form a plurality of units of encrypted data using a corresponding plurality of keys;
store key information associated with the plurality of keys in the first storage partition; and
store the plurality of units of encrypted data in a second storage partition of the plurality of storage partitions;
wherein the instructions configure the processor to de-map logical memory blocks from physical memory blocks of the first storage partition by configuring the processor to de-map logical memory blocks associated with the plurality of keys from physical memory blocks storing the key information;
wherein the instructions configure the processor to purge the de-mapped physical memory blocks listed in the local de-mapped block list by configuring the processor to purge physical memory blocks storing the key information.

35. The computer-readable medium of clauses 28-34, wherein the local purge command comprises an indication of the portion of the de-mapped physical memory blocks to purge.

36. A managed flash memory device, comprising:
a plurality of partitions, at least one of the plurality of partitions having a local de-mapped block list uniquely associated therewith, the plurality of partitions other than the at least one of the plurality of partitions having a global de-mapped block list associated therewith;
wherein the managed flash memory device is configured to:
receive a local purge command from a host device and, in response to the local purge command, purge at least a portion of de-mapped physical memory blocks listed only in the local de-mapped block list; and
receive a global purge command from a host device and, in response to the global purge command, purge all de-mapped physical memory blocks listed in the global de-mapped block list.

37. The managed flash memory device of clause 36, wherein the at least one of the plurality of partitions consists of a Replay Protected Memory Block.

What is claimed is:
1. A method for purging data from a memory device, comprising:
de-mapping logical memory blocks from physical memory blocks of a plurality of storage partitions of the memory device, wherein each of the plurality of storage partitions comprises a plurality of physical memory blocks;
listing de-mapped physical memory blocks only within a first storage partition of the plurality of storage partitions in a local de-mapped block list that is only associated with the first storage partition, the first storage partition is a Replay Protected Memory Block;
listing all de-mapped physical memory blocks of an entirety of the plurality of storage partitions of the memory device in a global de-mapped block list;
receiving a global purge command from a host device;
purging the de-mapped physical memory blocks listed in the global de-mapped block list in response to the global purge command;
generating a local purge command by the host device in order to purge only the de-mapped physical memory blocks within the first storage partition that are listed in the local de-mapped block list which is only associated with the first storage partition;
receiving the local purge command from the host device;
purging only the de-mapped physical memory blocks listed in the local de-mapped block list which is only associated with the first storage partition in response to the local purge command; and
listing purged physical memory blocks of the first storage partition in a local free block list, wherein the local free block list is only associated with the first storage partition.

2. The method of claim 1, wherein the memory device is non-volatile.

3. The method of claim 1, further comprising:
forming a plurality of units of encrypted data using a corresponding plurality of keys;
storing key information associated with the plurality of keys in the first storage partition; and
storing the plurality of units of encrypted data in a second storage partition of the plurality of storage partitions;
wherein de-mapping logical memory blocks from physical memory blocks of the first storage partition comprises de-mapping logical memory blocks associated with the plurality of keys from physical memory blocks storing the key information;
wherein purging the de-mapped physical memory blocks listed in the local de-mapped block list comprises purging physical memory blocks storing the key information.

4. The method of claim 1, further comprising:
providing a purge count to the host system in response to the local purge command; and
incrementing the purge count in response to the local purge command.

5. The method of claim 1, wherein receiving the local purge command comprises receiving an indication of the portion of the de-mapped physical memory blocks to purge.

6. A system for purging data from a memory device, comprising:
a data storage medium, wherein the data storage medium comprises a plurality of storage partitions and each of the plurality of storage partitions comprises a plurality of physical memory blocks; and
a controller coupled to the data storage medium, the controller configured to:
de-map logical memory blocks from physical memory blocks of the plurality of storage partitions of the data storage medium;
list de-mapped physical memory blocks only within a first storage partition of the plurality of storage partitions in a local de-mapped block list that is only associated with the first storage partition, the first storage partition is a Replay Protected Memory Block;
list all de-mapped physical memory blocks of an entirety of the plurality of storage partitions of the data storage medium in a global de-mapped block list;
receive a global purge command from a host device;
purge the de-mapped physical memory blocks listed in the global de-mapped block list in response to the global purge command;
generate a local purge command by the host device in order to purge only the de-mapped physical memory blocks within the first storage partition that are listed in the local de-mapped block list which is only associated with the first storage partition;
receive the local purge command from the host device;
purge only the de-mapped physical memory blocks listed in the local de-mapped block list which is only associated with the first storage partition in response to the local purge command; and
list purged physical memory blocks of the first storage partition in a local free block list, wherein the local free block list is only associated with the first storage partition.

7. The system of claim 6, wherein the data storage medium is non-volatile.

8. The system of claim 6, wherein the controller is further configured to:
form a plurality of units of encrypted data using a corresponding plurality of keys;
store key information associated with the plurality of keys in the first storage partition; and
store the plurality of units of encrypted data in a second storage partition of the plurality of storage partitions;
wherein the controller is configured to de-map logical memory blocks from physical memory blocks of the first storage partition by being configured to de-map logical memory blocks associated with the plurality of keys from physical memory blocks storing the key information;
wherein the controller is configured to purge the de-mapped physical memory blocks listed in the local de-mapped block list by being configured to purge physical memory blocks storing the key information.

9. The system of claim 6, wherein the controller is further configured to:
provide a purge count to the host system in response to the local purge command; and
increment the purge count in response to the local purge command.

10. The system of claim 6, wherein the local purge command comprises an indication of the portion of the de-mapped physical memory blocks to purge.

11. A non-transitory computer-readable medium for purging data from a memory device, comprising a non-transitory computer-readable medium having stored thereon in computer-executable form instructions that, when executed by a processor, configure the processor to:
de-map logical memory blocks from physical memory blocks of a plurality of storage partitions of the memory device, wherein each of the plurality of storage partitions comprises a plurality of physical memory blocks;
list de-mapped physical memory blocks only within a first storage partition of the plurality of storage partitions in a local de-mapped block that is only associated with the first storage partition, the first storage partition is a Replay Protected Memory Block;
list all de-mapped physical memory blocks of an entirety of the plurality of storage partitions of the memory device in a global de-mapped block list;
receive a global purge command from a host device;
purge the de-mapped physical memory blocks listed in the global de-mapped block list in response to the global purge command;
generating a local purge command by the host device in order to purge only the de-mapped physical memory blocks within the first storage partition that are listed in the local de-mapped block list which is only associated with the first storage partition;
receiving the local purge command from the host device;
purging only the de-mapped physical memory blocks listed in the local de-mapped block list which is only associated with the first storage partition in response to the local purge command; and listing purged physical memory blocks of the first storage partition in a local free block list, wherein the local free block list is only associated with the first storage partition.

12. The non-transitory computer-readable medium of claim 11, wherein the memory device is non-volatile.

13. The non-transitory computer-readable medium of claim 11, wherein the instructions further configure the processor to:

form a plurality of units of encrypted data using a corresponding plurality of keys;

store key information associated with the plurality of keys in the first storage partition; and store the plurality of units of encrypted data in a second storage partition of the plurality of storage partitions;

wherein the instructions configure the processor to de-map logical memory blocks from physical memory blocks of the first storage partition by configuring the processor to de-map logical memory blocks associated with the plurality of keys from physical memory blocks storing the key information;

wherein the instructions configure the processor to purge the de-mapped physical memory blocks listed in the local de-mapped block list by configuring the processor to purge physical memory blocks storing the key information.

14. The non-transitory computer-readable medium of claim 11, wherein the local purge command comprises an indication of the portion of the de-mapped physical memory blocks to purge.

\* \* \* \* \*